(12) United States Patent
Young

(10) Patent No.: US 8,630,332 B2
(45) Date of Patent: Jan. 14, 2014

(54) GNSS SIGNAL PROCESSOR

(75) Inventor: Philip John Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 12/595,450

(22) PCT Filed: May 9, 2008

(86) PCT No.: PCT/EP2008/055756
§ 371 (c)(1),
(2), (4) Date: Oct. 9, 2009

(87) PCT Pub. No.: WO2008/138891
PCT Pub. Date: Nov. 20, 2008

(65) Prior Publication Data
US 2010/0074308 A1    Mar. 25, 2010

(30) Foreign Application Priority Data

May 10, 2007  (EP) .................................... 07107873

(51) Int. Cl.
*H04B 1/69* (2011.01)
*H04B 1/707* (2011.01)
*H04B 1/713* (2011.01)

(52) U.S. Cl.
USPC ........... 375/150; 375/152; 375/147; 375/142; 375/143; 375/343

(58) Field of Classification Search
USPC .......... 375/150, 152, 295, 147, 142, 143, 343
See application file for complete search history.

(56) References Cited

U.S. PATENT DOCUMENTS

| 5,379,224 A | 1/1995 | Brown et al. |
| 6,044,105 A * | 3/2000 | Gronemeyer ................. 375/152 |
| 7,773,688 B2 * | 8/2010 | Sorrells et al. ................ 375/295 |
| 2006/0082496 A1 | 4/2006 | Winternitz et al. |

FOREIGN PATENT DOCUMENTS

| DE | 4114058 | 11/1992 |
| JP | 5256927 A | 10/1993 |
| JP | 2004534227 A | 11/2004 |
| JP | 2006254500 A | 9/2006 |
| WO | WO0010030 | 2/2000 |
| WO | WO03003807 A2 | 1/2003 |

OTHER PUBLICATIONS

International Search Report and Written Opinion—PCT/EP2008/055756, International Search Authority—European Patent Office—Dec. 15, 2008.

* cited by examiner

*Primary Examiner* — Phuong Phu
(74) *Attorney, Agent, or Firm* — Howard Seo

(57) ABSTRACT

A signal processor for GPS or other GNSS radiolocalization systems, includes a RAM pre-correlation buffer which is filled in sync with the code NCO, thus all sample alignment in the buffer is fixed The device further includes an amplitude compressor to limit the size of the buffer memory and is optimized to provide data to the following DFT unit in small bursts that can be processed in real time without the need for intermediate buffers. Thanks to these features the processor limits the amount of fast intermediate memories, is simpler and has lowerpower consumption.

36 Claims, 2 Drawing Sheets

GNSS SIGNAL PROCESSOR

FIELD OF THE INVENTION

The present invention concerns a satellite radiolocalization receiver and in particular, but not exclusively, a radiolocalization receiver adapted to receive and process radiolocalization signals generated by a constellation of geo-localization satellite, like for example the satellites of the GPS, GLONASS or Galileo System or other global navigation satellite systems (GNSS). The present invention also concerns a signal processor unit adapted for treating radiolocalization signals provided by a suitable RF interface, and which can be embedded in a dedicated GNSS apparatus or in another host system, like for example a general-purpose computer, PDA or cell phone.

DESCRIPTION OF RELATED ART

The Global Navigation Satellite Systems (GNSS) generically include the Global Positioning System (GPS), operated by the United States, the Global Orbiting Navigation Satellite System (GLONASS) operated by the Russian Federation and the projected Galileo positioning system, to be built by the European Union.

The following description and examples will often refer, for the sake of simplicity, to a GPS receiver only. It will be understood, however, that the present invention is not necessarily restricted to such a receiver, but includes also all GNSS sources, and can be extended to other future radiolocalization systems to which the invention is applicable.

GNSS radio signals are located in the portion of the radio spectrum above 1 GHz, have power level, at ground, of the order of −120 dBm or less and are generally direct-sequence spread-spectrum signals modulated by pseudo-random code binary sequences, which are used in the receiver for positioning and navigation. The general functioning of a satellite radiolocalization devices are well known and will be resumed briefly in the description. Reference is also made to International patent application, WO06069489 and WO05003807 and to European Patent applications EP1198068 and EP16121054 in the name of the applicant.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

In the case of the original GPS radiolocalization system, each of the operational GPS satellites, also indicated as Space Vehicle or SV, transmits a navigational radio signal at two carrier frequencies, referenced as "L1" and "L2" and situated at 1572.42 MHz and 1227.60 MHz respectively. The L1 and L2 carriers are modulated by two digital ranging code sequences, called the C/A (coarse acquisition) code and the P(Y) code, the latter being mostly restricted to the US government and military.

The C/A code, which is used by commercial GPS receiver, is modulated in the L1 and in the L2 carriers. C/A codes, which are unique for each GPS satellite, are pseudo-random Gold codes comprising a repetition of a 1023 bits, or "chips", with a transition rate of 1.023 MHz, and are often indicated in short as PRN. The C/A code thus repeats itself every millisecond. The ranging code sequences are synchronized to a common precise time reference, the "GPS time" which is held by precise clocks on board of each satellite, and which are synchronized to a master clock. The effect of the PSK modulation with the C/A code is to spread the spectrum of the modulated signal over a 1 MHz bandwidth.

Other radiolocalization systems, for example the proposed Galileo system and proposed extensions to the GPS system, also employ similar or equivalent signal structures, based on ranging codes synchronized to a common standard of absolute time.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise.

The signal strength of the GPS signals on earth surface is, nominally, −130 dBmW, a value which is further attenuated whenever the view of the sky is obstructed, and especially within buildings. Other satellite navigation systems provide signals of comparable strength. Such levels are well below the noise floor, thus the signal can be received only by use of statistical techniques.

In order to acquire these codes and perform a position fix a GPS receiver generates, for each received satellite, a local replica of the C/A code, the PRN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudorange, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

When searching for a GPS space vehicle (SV) we have to search in a 3 dimensional search domain, where the dimensions are SV-Id, Doppler, and code phase offset. Given that we may have no information to initialize the search we have to assume worst case that we will have to perform a full search over the entire search space for one or more SV's until we locate an SV to provide a timing reference, in other cases we may already have the knowledge of timing and position which can be applied to reduce the search space. Once a sufficient number of correlation the peaks are found, on the other hand, in the "tracking" state, the system has only to follow their drift, which is usually done with less difficulty or delay.

In order to speed up the acquisition state, many receivers adopt a massively parallel architecture, in which the correlation engine of the receiver comprises a large number of correlators, in order to explore several combinations of time shift and Doppler frequency in parallel. In typical cases, a correlation engine is able to perform correlation of the incoming signal with thousands of code phase-shift/Doppler frequency combinations.

Many known parallel search engines achieve a large computing speed by memorizing source data in memory and then processing this data in the time domain at a frequency higher than the data rate as provided by the SV. These appear to be taking advantage of the gold code being 1023=11*3*31 chips in length and allocating resources as a function of these prime numbers, for example buffering 31 chips of source data and performing correlations against this input buffer for 33 code phase/Doppler combinations divided between a number of channels.

All of these architectures suffer from the drawback of sampling the data at the reference clock frequency, compensating for the 'ideal' code rate and buffering samples at some multiple of this code rate.

A further limitation of known parallel correlators is that the memorized samples have to be offset according to value of the NCO oscillator in the correlator. This require a dedicated circuitry, usually involving large register based buffers and complex sample steering logic, which consumes power and takes up silicon space.

Additionally, known parallel GPS correlators produce short bursts of partial correlation results, which have to be stored in intermediate buffer before further processing can take place. This pipelining is another cause of power consumption and costs. As title of comparison, in known massively parallel architectures, the intermediate buffer between the correlation and the DFT engine represents the largest and faster memory of the device.

Known GPS correlator use downsampling in the input data, i.e. they sub-sample the input data at a frequency that is lower than the correlation frequency and interpolate on the output of the sample buffer. This limits the performance and efficacy of the correlation stage.

BRIEF SUMMARY OF THE INVENTION

It is an object of the present invention to provide an improved correlator for a GNSS processor which overcomes the limitation of the prior art. In particular, the present invention aims to provide a GNSS massively parallel processor which is simpler, more economical and consumes less power than known processors of equivalent performances.

Further objects of the invention are the provision of a processor which requires less intermediate buffers and does not need a complex sample-offset circuitry.

These goals are attained by a new massively parallel processor comprising the features claim 1. The processor of the invention is based on an early buffering of the data, before the correlation engine, which is then arranged to process them at high speed. The whole architecture is optimized to avoid intermediate storages, by adjusting the throughput of all stages.

BRIEF DESCRIPTION OF THE DRAWINGS

The invention will be better understood with the aid of the description of an embodiment given by way of example and illustrated by the figures, in which.

DETAILED DESCRIPTION OF MODES OF REALIZATION OF THE INVENTION

Figure 1:
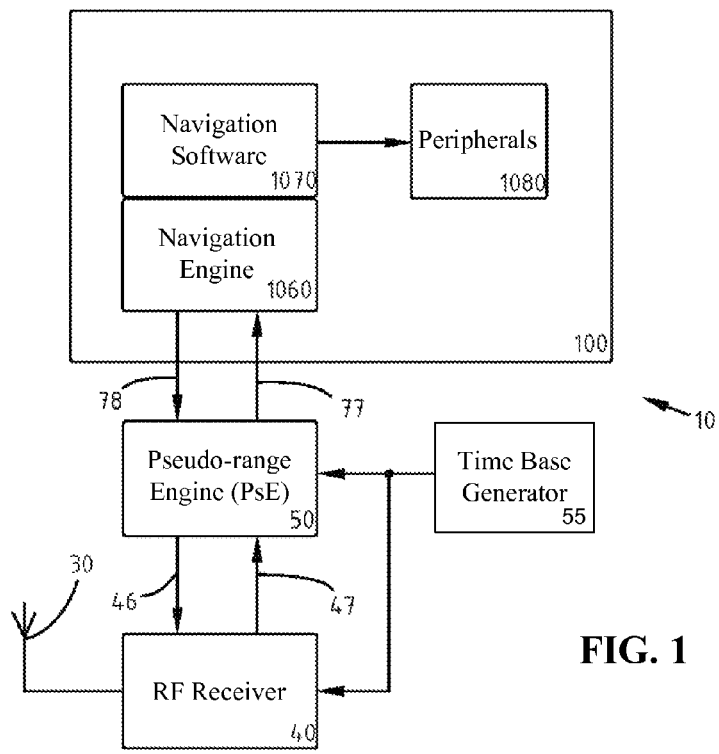
FIG. 1 reproduces, in schematic form, the architecture of a GNSS receiver suitable for the implementation of the invention

FIG. 1 represents schematically the layout of a generic GNSS device 10 comprising one or more antennas 30 which allow coupling with radio signals radiated from different GNSS satellites.

According to FIG. 1, the radiolocalization device 10 of the present invention comprises a RF-receiver or radiofrequency module 40, whose function is to process the signals received from the radiolocalization satellites by the antenna 30. The radiofrequency circuit comprises a single- or multiple-conversion heterodyne radio receiver and provides at his output 47 a navigation signal of low frequency, like a baseband signal, analogue or digital, or a low-IF signal, for example a low-If signal at 4.092 MHz.

According to the modulation scheme of the received satellite constellation, the output 45 will comprise several angular component of the signal. In the case of GPS, for example, two components shifted by 90° are needed, and are conventionally referred to as the I (In-phase) and Q (Quadraphase) component. Other modulation schemes, for example the modulation proposed for the GALILEO system, call for more than two angular components.

The RF module 40 is connected to a main time base generator 55, which provides a stable time base reference for the radiolocalization device 10, for example a 32.734 MHz time base. Since time base generator 55 must be considerably precise and stable to allow acquisition and tracking of the GPS signal, it comprises generally a high-quality temperature compensated crystal oscillator or TCXO.

The output 47 of the RF module 40 is fed to a signal processor 50, also called pseudo-range engine 50 which, in turn, provides control instructions 46 to the RF circuit 40. The function of the pseudo-range engine 50 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 50 are transmitted to the navigation engine 1060, which calculates a fix for position and time coordinates x, y, z, t. The navigation engine also steers the pseudo-range engine 50 by appropriate search instructions 78. The positional fix is usually obtained by iterative Kalman filters, or by other known means, and the navigation engine may need to follow the pseudo-range data 77 along several code periods until a satisfactory solution is found.

Preferably the pseudo-range engine 50 and the RF module 40 are realized as two separate integrated circuits or as a single common integrated circuit.

In the illustrated variant of the invention the navigation engine 1060 is part of a host system 100, which also comprises application navigation software 1070 and appropriate peripherals 1080 for interaction with a user. The radiolocalization device 10 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine. In this case the functions of the navigation engine 1060 and of the pseudo-range engine 50 could conveniently be grouped in a single-chip device.

In the case of a multi-standard GNSS radiolocalization device, the received satellites may belong to several satellite constellations, for example to the GPS, Galileo, or GLONASS constellations, and emit in several radio bands.

Preferred embodiments of the invention have circuitry elements or the software equivalents thereof for performing correlation. Such elements, when broken down into abstracted, individual units, may be referred to as "taps", with reference to a classical correlation architecture based on tapped shift registers. It must be kept in mind, however, that the present invention is not limited to this particular architecture, and that the term "tap" designates here an abstract correlation unit, arranged to produce a correlation value, and which may also be partially or totally realized in software.

Figure 2:
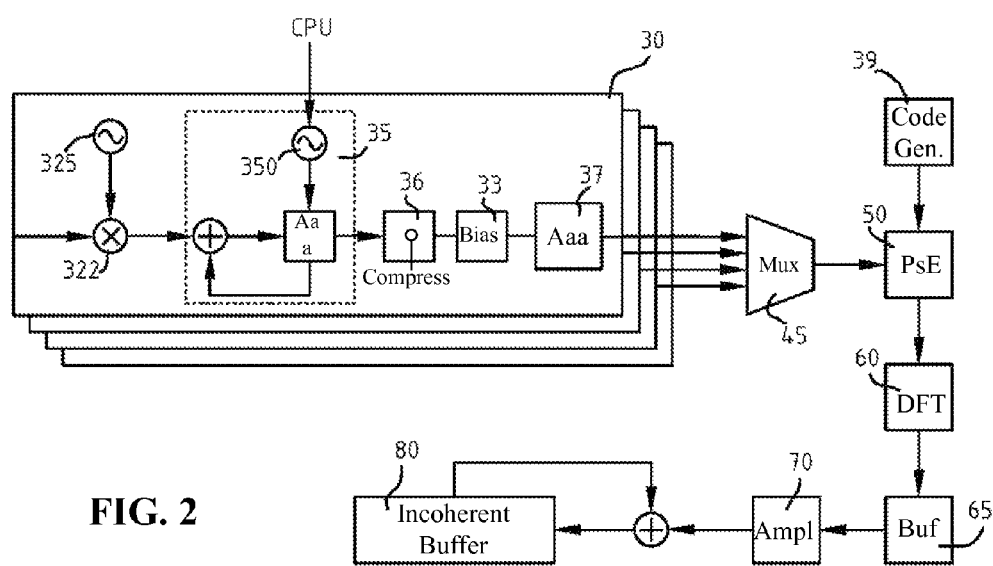
FIG. 2 presents a schematic diagram of a possible realization of a GPS correlation engine.

According to FIG. 2, the GNSS processor of the invention comprises a carrier wipeoff stage, comprising a mixer 322 and a local oscillator, which removes an estimated or known carrier wave from the digital samples providing a baseband signal, as it is known in the art. Such carrier wipeoff circuits are typically shared by a number of different correlators. The processor further includes at least one sampling stage 35 for recording the carrier-stripped data in the baseband signal in a pre-correlation buffer 37. The sampling stage is clocked by the code NCO 350, whose rate is controlled, for example by the CPU (not represented) according to the Doppler shift of a satellite whose acquisition is intended. The pre-correlation samples in buffer 37 are, therefore, automatically sampled in chip units, and one can avoid the sampled-alignment logic needed to accommodate Doppler shifts of the SV.

Since each SV has an independent and different Doppler shift, the processor of the invention preferably comprises a plurality of code-generators code NCO 350 and pre-correlation buffers 37. This parallelization of resources with respect to SV contributes to the processing power of the GNSS processor.

According to another aspect of the invention, the dynamic of range of signals in the pre-correlation buffer is compressed, by compression unit 36. A valuable memory saving can be achieved this way, with negligible effects on the correlation result. Taking, for sake of example, a 20 Hz sampling rate for the carrier-stripped signal, and supposing that each carrier-stripped sample is represented by one of (−3, −2, −1, 0, 1, 2, 3) values (coded in 3 bits), and supposing that one integrates them to ½ chip samples in the pre-correlation buffer, one can see that such pre-correlation buffer should store, in a fully linear mode, values in the [−30, 30] range.

Figure 3:
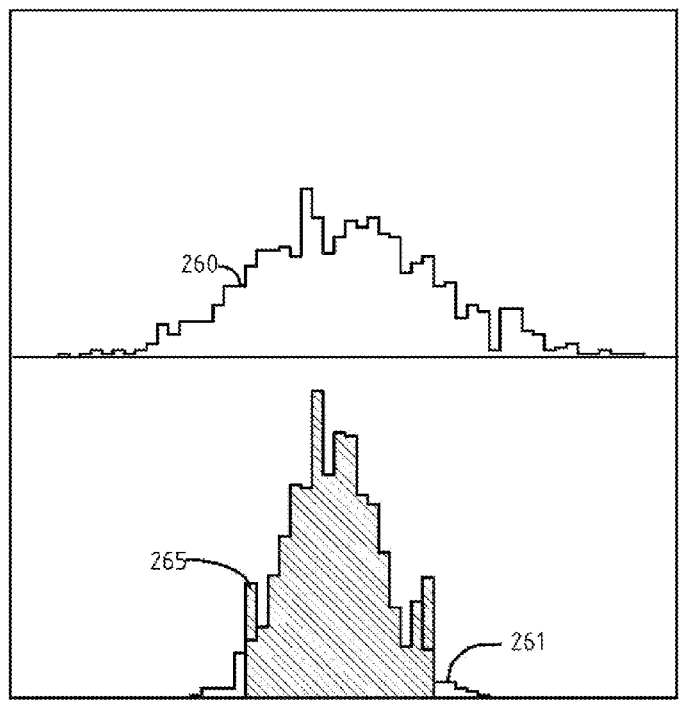
FIG. 3 illustrates a dynamics compression operation according to one aspect of the invention.

The values in the pre-correlation buffer are distributed according to a bell-shaped curve 260, and as shown for example in FIG. 3 for example centred on zero, and with quickly decreasing tails. Very few samples, statistically, will be in the tails, and the result of the correlation that is to be performed will not change appreciably, if the values in the tail of the distribution are misrepresented.

Accordingly, the invention may include a compression unit 36, to compress the dynamics of the pre-correlation signals, preferably by a linear scaling function, or by a nonlinear compression function. According to one possible illustrated example, the compression unit 36 clips the resulting values signal above and below predefined upper and lower threshold values. Values exceeding upper and lower thresholds are discarded, on represented at the corresponding threshold value. Amplitude linear scaling may optionally be used before clipping. FIG. 3 shows the theoretical distribution 260 of the pre-correlation samples in fully linear representation, the distribution of the scaled-down samples 261 and the distribution 265 (hatched) of the samples after application of the saturation operator.

Other compression systems are also possible and included in the scope of the present invention. The compression unit could use, for example a double-linear response, or an approximate logarithmic response, or any non-linear compression function, as it is known in the art. The dynamic range of the pre-correlation buffer can then be reduced, with a corresponding saving in memory size, with no ill effect on the performances of the search engine.

Preferably, the processor of the invention also includes a biasing unit 33, operatively arranged to encode the values stored in the pre-correlation buffer in a digital number that is always non-negative or always non-positive, for example by adding a fixed bias to the data. All the successive stages, including the correlator 50, are adapted to process digital data in this unsigned format.

The use of non-negative values in the processor of the invention allows a simpler logical structure, thus a reduced silicon area and, as a consequence a better routing. Timing needs are also more relaxed in the correlation units of the invention, than in conventional correlators, if unsigned integers are used. Besides being advantageous in themselves, these features further contribute to power saving.

According to another, not represented, variant of the invention, an equivalent data biasing is obtained after the correlator 50, by adding a fixed bias to the code-stripped data. In this case signed data are stored in the pre-correlation buffer 37.

Although the length of the gold codes used in GPS signals is of 1023 chips, the processor of the invention preferably treats the gold code as a 1024 chips sequence, by suitable adaptation in the code generator 39 (FIG. 2). The pre-correlation data can thus be efficiently stored and retrieved in a RAM.

Referring again to FIG. 2, The SV signal needs compensating for both code and carrier Doppler, however since the carrier rate is 1540 times the code Doppler the losses due to code Doppler can be ignored for most practical purposes, and in particular in the correlators 50, provided the data is sampled within a few tens of mHz of the actual code Doppler.

Data stored in pre-correlation buffers 37 are correlated at high speed in correlators 50, with local replica codes generated by code generators 39. Preferably, ach correlator operates, by multiplexer 45, on data provided by several independent channels 30, each channel being dedicated to the acquisition of one determined SV. The correlator output is fed to the DFT engine 60 to increase the frequency search space for each correlation. This imposes some constraints on the maximum search time against the code Doppler, in order to limit gain losses due to the gradual drift of the replica code against the actual code. Up to about ⅓ chip offset it is still possible to usefully accumulate the results through a DFT. Additionally there is a loss in the DFT on lines further from the centre frequency so the DFT is limited, for example, to 8 lines.

To improve the pipelining, the correlators 50 are designed to provide a set of correlation data to the DFT engine every 4 us, this being the rate that the DFT is able to process in real time, without the need of an intermediate buffer.

Referring again to FIG. 2, The DFT unit 60 provides coherent integration values having both a real (I) and an imaginary part (Q). These are fed, preferably via a coherent memory buffer 65, to the amplitude processor 70 which calculates absolute correlation values and accumulates the result in an incoherent integration buffer 80. Since the amplitude of the correlation values are by definition non negative values, the data in the incoherent integration buffer are non-decreasing function of time. Preferably, and according to another aspect of the invention, the amplitude processor 70 subtracts a baseline value from the incoherent integration data, and stores in the buffer 80 only the part exceeding the baseline. In this way, the data stored in the buffer are smaller, thus the size and power consumption of buffer 80 can be reduced.

According to an optional feature of the present invention, the output of correlator 50 is down-scaled by an appropriate scaling unit (not shown) before feeding to the DFT engine 60, in order to reduce memory requirements in the latter.

Figure 4:
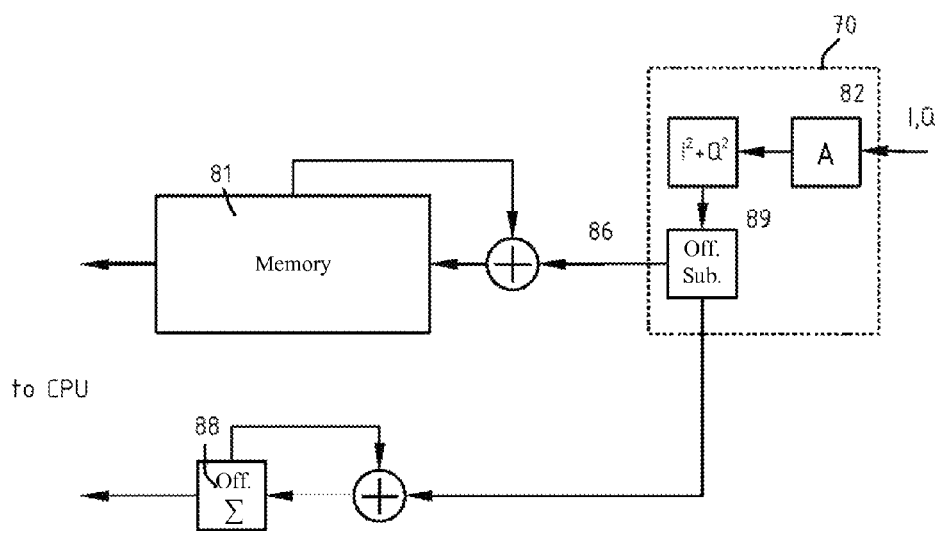
FIG. 4 shows a baseline subtraction scheme according to one aspect of the invention.

FIG. 4 illustrates an example of baseline subtraction according to this aspect of the invention. Memory area 81 contains a plurality of memory registers used to store the result of coherent integration for a desired set of taps in a GNSS receiver. Memory area 81 is updated periodically, during acquisition with new values of amplitudes provided by the amplitude module 70 the coherently integrated correlations.

Amplitude module 70 calculates absolute value (or, equivalently, the square) of I, Q data provided by coherent integration data and, optionally, divides data by a predefined scaling factor in prescaler 82, providing increment values 186 for the incoherent integration.

According to a preferred aspect of the invention, amplitude module 70 comprises an offset subtraction unit 89, which subtracts an offset value from amplitude data. The offset values are independently summed and stored in offset accumulator 88, while individual tap amplitudes are accumulated in incoherent integration memory 81. The offset value is recalculated, at each coherent integration cycle, for example as the minimum amplitude among all the considered taps, but other choices are possible. The incoherent memory 81 and the offset accumulator 88 are both available to the CPU (not represented in the drawing), which can easily recombine them to obtain the accumulated amplitudes, when needed.

An advantage of the disposition of FIG. 4 is that the data stored in memory area 81 do not grow linearly in magnitude with the progression of incoherent integration. Rather, by choosing suitable values for the offset, the memory area 81 shall store only differential values, in the distribution of incoherently integrated values. Module 70 of FIG. 3 thus realizes a compression of incoherent integration data, because small values can be represented in a reduced number of bits.

We will now provide a detailed example of implementation of a processor according to the invention. We wish to calculate a correlation between a gold code generated by a local Pseudo-Random Noise Generator (PRNG) and a set of data samples stored in the pre-correlation buffer 37.

Let p be the phase difference between the data sample set and the replica code from the PRNG., let $T_p$ (Tap p) be the correlation between the data and replica code at phase p, let $S_n$ be the sample at offset n from the start of the sample buffer and let $C_n$ represent code sample n from the code boundary. Assuming the code repeats periodically we can calculate a correlation over M data samples as follows $$T_p = \sum_{n=0}^{M-1} S_{(p+n)} \cdot C_n$$

In order to reduce the data pipeline width and accumulator logic we need to compute the correlation iteratively using a smaller data pipeline and repeating the accumulation in a number of steps. Assuming we choose a width for our data pipeline W as the number of samples we can process in a single cycle, we can then compute this correlation in M/W cycles.

$$T_p = \sum_{l=0}^{M/W} \sum_{n=0}^{W-1} S_{(p+n+l \cdot W)} \cdot C_{(n+l \cdot W)}$$

Now assuming that we want to calculate K contiguous taps starting at tap $T_p$, we number the taps $T_p$ to $T_{(p+k)}$ $0 \leq k \leq K-1$ we get the following equation for $T_{(p+k)}$ $$T_{p+k} = \sum_{l=0}^{M/W} \sum_{n=0}^{W-1} S_{(p+n+l \cdot W+k)} \cdot C_{(n+l \cdot W)}$$

From this equation it can be seen that in any cycle the correlator needs code samples $C_{nc}$ where $$(l \cdot W) \leq nc \leq (((l+1) \cdot W)-1)$$

and data samples $S_{ns}$ where $$(l \cdot W + p) \leq ns \leq ((l \cdot (W+1))+K+p-1)$$

Assuming that our data buffer is implemented in RAM to reduce power and logic, then we have the constraint on the range of samples that can be provided in any cycle, and we can compensate this by offsetting the phase of the code at startup. Additionally we can see that most data samples are required in 2 correlation cycles.

Now for a practical implementation we can select a technology and suitable clocking plan which leads to the hardware requirements, For example assuming we have a required tap spacing of ½ uS and our code chip rate is 1 us, we select a suitable maximum clock frequency of 72 Mhz we now have to select the data pipeline width We choose, for example, a repetition rate of 4 us for the correlation and can then allocate 288 cycles for the correlation, since the code length is 2046 samples (M=2046) we select processing 8 code phases (W=8) per slot in 256 integration cycles. Also, as we want to cover the entire code epoch, 2046 taps, we require that we produce (2046/8) i.e. 8 code taps per slot (K=8). It is clear, however, that other M/N combinations could also be possible, according to the circumstances Putting these into the equations above each cycle of correlation will need 8 code samples and 15 data samples; however we can reduce the code samples to 4 since the code is 1023 chips long, hence each code chip provides 2 code samples.

Thus in cycle (i) we need code samples $C_{(8i)}$ to $C_{(8i+7)}$ and data samples $S_{(8i+p)}$ to $S_{(8i+p+15)}$ In cycle (i+1) we need code samples $C_{(8i+8)}$ to $C_{(8i+16)}$ and data samples $S_{(8i+p+8)}$ to $S_{(8i+p+23)}$ The code for each cycle is unique, but the data for each cycle overlaps so that data samples $S_{(8i+p+8)}$ to $S_{(8i+p+15)}$ are used in cycles (i) and (i+1), this allows us to buffer them locally in the correlator and reduce the number of new data samples provided in each cycle to just 8.

This also requires an initial load cycle where the first 8 samples are loaded and no correlation is performed, the subsequent cycles perform the correlation, but this results in a code phase misalignment, this is adjusted by applying the code phase shift relationship p together with an implementation defined constant offset to the code.

Now we have a data path that is capable of producing 8 taps of correlation on 8 contiguous code phases every 4 us, and repeating this 256 times will produce 2048 taps of data every 1 ms.

This works well provided that the data samples are always synchronous to the code rate, but the actual gold code against which we are correlating has length 1023 chips, or 2046 samples, consequently tap 0 will be produced on correlator output 0 in the first slot (slot 0) and will then be produced again on the $7^{th}$ correlator output in the $256^{th}$ slot (slot 255), resulting in slot 0 of the following ms producing taps 2 ... 9.

This is not a problem when the taps are to be buffered and post processed, however we wish to accumulate the correlation results and process them using a DFT engine to gain a wider Doppler search range, and for this to be implemented without buffering it is preferable to have each tap phase always aligned on the same correlator output.

To achieve this we can simply apply a phase shift to the code at the end of the last slot to re-align the codes in the following ms period, this results in 2048 taps being produced and the last 2 taps discarded as they are a duplicate of the first 2.

In general terms, some of the embodiments of the present invention foresee the introduction of a phase shift to the code generator at the end of each code period, in order to time-align the local replica codes with the data in the pre-correlation buffer 37. This is advantageous as the processor can then be dimensioned in "natural" sizes which are powers of two, even if the PRN codes do not have a length which is a power of two, like the gold codes used in GPS which have a length of 1023 chips.

In order to simplify the data pipeline so that data is always correctly aligned it is very important that the data samples are always correctly aligned in the input buffer, this is achieved by using the pre-correlation buffer stage already which is filled in sync with the code NCO adjusted for the code Doppler, this ensures that for an infinite time the data samples are correctly aligned and the correlation can proceed indefinitely without any further alignment being necessary, this has a huge benefit in hardware simplification and power reduction.

Now that we have selected the data pipeline architecture it becomes apparent that we need to provide 256 data sets for each correlation, so we set the data sample buffer memory width to 8 samples accordingly, and configure the correlation engine to produce the required taps, however in order to produce all 8 taps we require 2046+7 data samples, this requires 257 entries in the input data buffer.

To simplify the hardware we can design the data buffer as 256 entries deep and design the pipeline to that the oldest data sample is first read and passed to the correlator before being overwritten with new data, then a further 256 reads are performed producing the required 257 data sets.

Since this implies that we are discarding a data sample set in each correlation slot we realize that the oldest data sample for each slot conveniently has a phase offset from the previous slot of 8 samples (taps) consequently we can start each correlation using the oldest data and exactly the same code phase as the previous slot.

Then after all correlations within a ms have been completed we need to phase shift the code for the following ms period by 2 samples in order to provide the desired tap alignment in the next ms period.

According to a preferred variant, the signal processor of the invention does not use downsampling, in the input buffer. i.e. the processor samples the input at a rate determined by the Code NCO oscillator 350, multiplies these samples by the carrier signal at the same rate, then accumulates all samples storing accumulated results at the same Code NCO rate.

According to this variant the code generator actually does not produce a code phase shift at the end of every code period, since the sample data is shifted, so it periodically inserts a code phase shift under control of the channels state machine, but this actually occurs once per ms, not at the end of every code period, since the change in phase of the sampled data between slots is exactly equal to the code phase window covered by the correlation in the slot.

The invention claimed is:

1. A signal processor for a GNSS digital signal comprising spread-spectrum radiolocalization signals, received from radiolocalization satellites, each satellite transmitting a radiolocalization signal modulated by a known PRN code, having a Doppler shift and a code phase shift, the signal processor comprising:
    at least one carrier wipeoff unit, configured to remove a carrier component from said GNSS signal and to provide a carrier-stripped GNSS signal,
    at least one sampling stage that samples the carrier-stripped GNSS signal, the at least one sampling stage comprising
        accumulation means driven by a programmable oscillator configured to generate a number of samples of programmable duration determined by the output of the programmable oscillator, which is controlled according to the Doppler shift of a satellite whose acquisition is intended, and
        a pre-correlation buffer memory, arranged to store the succession of samples produced by the sampling stage,
    at least one correlation engine, arranged to correlate the samples in the pre-correlation buffer with a plurality of local replicas of the PRN codes, each replica having a phase shift, and to generate a plurality of correlation values.

2. The signal processor of claim 1, further comprising a compression unit that reduces the dynamic range of the sampled signals according to a linear or non-linear compression function.

3. The signal processor of claim 1, further comprising a biasing unit, operatively arranged to encode the values stored in the pre-correlation buffer in a digital number that is always non-negative or always non-positive.

4. The signal processor of claim 1, comprising at least one code generator generating the local replicas of the PRN codes, wherein said code generator is arranged to introduce a phase-shift in the code at the end of each code period.

5. The signal processor of claim 1, further comprising a DFT engine connected to an output of the correlation engine, arranged to produce multiple correlation taps arranged on several Doppler shifts lines.

6. The signal processor of claim 5, wherein the correlation engine produces data at a rate that can be handled in real time by the DFT engine.

7. The signal processor of claim 5, further comprising a scaling unit to down-scale the correlation values generated by the correlation engine and provided to the DFT engine.

8. The signal processor of claim 1, further comprising an amplitude module, an incoherent integration memory arranged to accumulate the output of the amplitude module, and an offset subtraction unit arranged to remove a common offset from amplitude data generated from the amplitude module.

9. A processing method for a GNSS radiolocalization signal comprising the steps of:
generating or receiving a carrier-stripped GNSS signal comprising spread-spectrum radiolocalization signals, received from radiolocalization satellites, each satellite transmitting a radiolocalization signal modulated by a known PRN code, having a Doppler shift and a code phase shift,
sampling the carrier-stripped GNSS signal according to a programmable oscillator, which is programmed according to the Doppler shift of a satellite whose acquisition is intended, and storing the samples obtained from the sampling in a pre-correlation buffer memory,
correlating the samples in the pre-correlation buffer with a plurality of local replicas of the PRN code, each replica having a phase shift, and to generate a plurality of correlation values.

10. The processing method of claim 9, further comprising a step of compressing the dynamic range of data in said pre-correlation buffer.

11. The processing method of claim 9, further comprising a step of encoding the values stored in the pre-correlation buffer in a digital number that is always non-negative or always non-positive.

12. The processing method of claim 9, further comprising a step of generating local replicas of the PRN codes having a phase-shift in the code at the end of each code period.

13. The processing method of claim 9, further comprising a step of applying DFT operations to the correlation values in order to obtain multiple correlation taps arranged on a plurality of Doppler shifts lines.

14. The processing method of claim 13, further comprising a step of computing amplitude values of the correlation taps, and a step of integrating the amplitude in an incoherent integration memory area after subtraction of a common offset amplitude.

15. The signal processor of claim 1, in which the sampling stage generates samples of the carrier-stripped signal at a sampling rate determined by the programmable oscillator, and the correlation engine generate said correlation values at a correlation rate that equals the sampling rate.

16. The signal processor of claim 15, wherein the correlation values are accumulated in the accumulation means at a rate that equals the sampling rate.

17. The signal processor of claim 1, further comprising:
a biasing unit adapted to encode the values stored in the pre-correlation buffer in a digital number that is always non-negative or always non-positive;
at least one code generator that generates the local replicas of the PRN codes, wherein said code generator is configured to introduce a phase-shift in the code at the end of each code period;
a DFT engine coupled to an output of the correlation engine, and configured to produce multiple correlation taps arranged on a plurality of Doppler shifts lines, wherein the correlation engine produces data at a rate that can be handled in real time by the DFT engine; and
a scaling unit to down-scale the correlation values generated by a correlator and provided to the DFT engine,
wherein the sampling stage generates samples of the carrier-stripped signal at a sampling rate determined by the programmable oscillator, and
wherein the correlation values are accumulated in the accumulation means at a rate that equals the sampling rate.

18. The signal processor of claim 1, further comprising:
a compression unit that reduces the dynamic range of the sampled signals according to a linear or non-linear compression function;
a biasing unit adapted to encode the values stored in the pre-correlation buffer in a digital number that is always non-negative or always non-positive;
at least one code generator that generates the local replicas of the PRN codes, wherein said code generator is configured to introduce a phase-shift in the code at the end of each code period;
a DFT engine coupled to an output of the correlation engine, and configured to produce multiple correlation taps arranged on a plurality of Doppler shifts lines, wherein the correlation engine produces data at a rate that can be handled in real time by the DFT engine; and
a scaling unit to down-scale the correlation values generated by a correlator and provided to the DFT engine.

19. The processing method of claim 9, further comprising:
encoding the values stored in the pre-correlation buffer in a digital number that is always non-negative or always non-positive;
generating local replicas of the PRN codes having a phase-shift in the code at the end of each code period;
applying DFT operations to the correlation values in order to obtain multiple correlation taps arranged on several Doppler shifts lines;
computing amplitude values of the correlation taps; and
integrating the amplitude in an incoherent integration memory area after subtraction of a common offset amplitude.

20. An apparatus for processing a GNSS radiolocalization signal, comprising:
means for generating or receiving a carrier-stripped GNSS signal comprising spread-spectrum radiolocalization signals received from radiolocalization satellites, each satellite transmitting a radiolocalization signal modulated by a known PRN code, having a Doppler shift and a code phase shift;
means for sampling the carrier-stripped GNSS signal according to a programmable oscillator, which is programmed according to the Doppler shift of a satellite whose acquisition is intended, and for storing samples of the carrier-stripped GNSS signal in a pre-correlation buffer memory; and
means for correlating the samples in the pre-correlation buffer with a plurality of local replicas of the PRN code, each replica having a phase shift, and for generating a plurality of correlation values.

21. The apparatus of claim 20, wherein the means for sampling the carrier-stripped GNSS signal and for storing the samples compresses the dynamic range of data in said pre-correlation buffer.

22. The apparatus of claim 20, wherein the means for sampling the carrier-stripped GNSS signal and for storing the samples encodes the values stored in the pre-correlation buffer in a digital number that is always non-negative or always non-positive.

23. The apparatus of claim 20, wherein the means for correlating the samples generates local replicas of the PRN codes having a phase-shift in the code at the end of each code period.

24. The apparatus of claim 20, wherein the means for correlating the samples applies DFT operations to the correlation values in order to obtain multiple correlation taps arranged on several a plurality of Doppler shifts lines.

25. An apparatus for wireless communication, comprising:
a processing system configured to:
generate or receive a carrier-stripped GNSS signal comprising spread-spectrum radiolocalization signals received from radiolocalization satellites, each satellite transmitting a radiolocalization signal modulated by a known PRN code, having a Doppler shift and a code phase shift;
sample the carrier-stripped GNSS signal according to a programmable oscillator, which is programmed according to the Doppler shift of a satellite whose acquisition is intended, and store samples of the carrier-stripped GNSS signal of the obtained in a pre-correlation buffer memory; and
correlate the samples in the pre-correlation buffer with a plurality of local replicas of the PRN code, each replica having a phase shift, and for generating a plurality of correlation values.

26. The apparatus of claim 25, wherein the processing system is further configured to compress the dynamic range of data in said pre-correlation buffer.

27. The apparatus of claim 25, wherein the processing system is further configured to encode the values stored in the pre-correlation buffer in a digital number that is always non-negative or always non-positive.

28. The apparatus of claim 25, wherein the processing system is further configured to generate local replicas of the PRN codes having a phase-shift in the code at the end of each code period.

29. The apparatus of claim 25, wherein the processing system is further configured to apply DFT operations to the correlation values in order to obtain multiple correlation taps arranged on a plurality of Doppler shifts lines.

30. The apparatus of claim 25, wherein the processing system is further configured to compute amplitude values of the correlation taps.

31. A computer program product, comprising:
one or more processors responsive to instructions that cause the one or more processors to:
generate or receive a carrier-stripped GNSS signal comprising spread-spectrum radiolocalization signals, received from radiolocalization satellites, each satellite transmitting a radiolocalization signal modulated by a known PRN code, having a Doppler shift and a code phase shift,
sample the carrier-stripped GNSS signal according to a programmable oscillator, which is programmed according to the Doppler shift of a satellite whose acquisition is intended, and store the samples obtained from the sampling in a pre-correlation buffer memory,
correlate the samples in the pre-correlation buffer with a plurality of local replicas of the PRN code, each replica having a phase shift, and generate a plurality of correlation values.

32. The computer program product of claim 31, wherein the instructions further cause the one or more processors to compress the dynamic range of data in said pre-correlation buffer.

33. The computer program product of claim 31, wherein the instructions further cause the one or more processors to encode the values stored in the pre-correlation buffer in a digital number that is always non-negative or always non-positive.

34. The computer program product of claim 31, wherein the instructions further cause the one or more processors to generate local replicas of the PRN codes having a phase-shift in the code at the end of each code period.

35. The computer program product of claim 31, wherein the instructions further cause the one or more processors to apply applying DFT operations to the correlation values in order to obtain multiple correlation taps arranged on a plurality of Doppler shifts lines.

36. The computer program product of claim 31, wherein the instructions further cause the one or more processors to compute computing amplitude values of the correlation taps.

* * * * *